(12) United States Patent
Seefeld et al.

(10) Patent No.: US 8,037,166 B2
(45) Date of Patent: Oct. 11, 2011

(54) SYSTEM AND METHOD OF DISPLAYING SEARCH RESULTS BASED ON DENSITY

(75) Inventors: Bernhard Seefeld, New York, NY (US); Octavian Procopiuc, Summit, NJ (US); Nina Kang, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 12/359,715

(22) Filed: Jan. 26, 2009

(65) Prior Publication Data

US 2010/0191797 A1     Jul. 29, 2010

(51) Int. Cl.
*G06F 11/30*     (2006.01)
(52) U.S. Cl. ........ 709/223; 709/217; 707/724; 707/723; 707/735; 707/736
(58) Field of Classification Search .................. 709/224, 709/203, 217–219, 223; 707/724, 723, 735, 707/736, 754, 756, 769, 780, 918, 919, 921
See application file for complete search history.

(56) References Cited

U.S. PATENT DOCUMENTS

| | | | |
|---|---|---|---|
| 4,675,676 A | 6/1987 | Takanabe et al. | |
| 5,444,618 A | 8/1995 | Seki et al. | |
| 5,778,362 A | 7/1998 | Deerwester | |
| 6,144,920 A | 11/2000 | Mikame | |
| 6,397,143 B1 | 5/2002 | Peschke | |
| 6,542,814 B2 | 4/2003 | Polidi et al. | |
| 7,076,505 B2 | 7/2006 | Campbell | |
| 7,145,478 B2 | 12/2006 | Goncalves et al. | |
| 7,181,438 B1 | 2/2007 | Szabo | |
| 7,353,109 B2 | 4/2008 | Han | |
| 7,437,370 B1 | 10/2008 | Ershov | |
| 7,475,072 B1 | 1/2009 | Ershov | |
| 7,953,732 B2 * | 5/2011 | Frank et al. ................... | 707/724 |
| 2004/0111215 A1 | 6/2004 | Inoue | |
| 2006/0041375 A1 | 2/2006 | Witmer et al. | |
| 2006/0184317 A1 | 8/2006 | Asahara et al. | |
| 2007/0014488 A1 | 1/2007 | Chen et al. | |
| 2007/0050423 A1 | 3/2007 | Whalen et al. | |
| 2007/0250264 A1 | 10/2007 | Sekine et al. | |
| 2008/0004795 A1 | 1/2008 | Pun | |
| 2008/0010262 A1 | 1/2008 | Frank | |

(Continued)

FOREIGN PATENT DOCUMENTS

JP     2007057503 A     3/2007

(Continued)

OTHER PUBLICATIONS http://www.smalltownbrooklyn.com/smalltownbrooklyn/parkslopeN/PslopeNhome.html, printed Oct. 15, 2009.

(Continued)

*Primary Examiner* — Kenneth R Coulter
(74) *Attorney, Agent, or Firm* — Lerner, David, Littenberg, Krumholz & Mentlik, LLP

(57) ABSTRACT

A system and method is provided of generating a map. In one aspect, the map is selected based on a location provided by a user and listings are selected based on their proximity to the location, whether they match a query provided by the user, and the number of matching listings within regions of the map.

16 Claims, 16 Drawing Sheets

U.S. PATENT DOCUMENTS

| | | | |
|---|---|---|---|
| 2008/0010273 A1 | 1/2008 | Frank | |
| 2008/0033936 A1 | 2/2008 | Frank | |
| 2008/0056538 A1 | 3/2008 | Frank | |
| 2008/0065685 A1 | 3/2008 | Frank | |
| 2008/0172244 A1* | 7/2008 | Coupal et al. | 705/1 |
| 2008/0229225 A1* | 9/2008 | Kaye | 715/771 |
| 2008/0301643 A1 | 12/2008 | Appleton et al. | |
| 2010/0191798 A1* | 7/2010 | Seefeld et al. | 709/203 |
| 2010/0325129 A1* | 12/2010 | Ahuja et al. | 707/759 |

FOREIGN PATENT DOCUMENTS

| | | |
|---|---|---|
| JP | 2007183249 A | 7/2007 |
| JP | 2008304246 A | 12/2008 |

OTHER PUBLICATIONS http://maps.google.com, submitted on Oct. 28, 2009.

http://www.tavernoxoros.gr/, submitted on Oct. 28, 2009.

http://en.wikipedia.org/wiki/Wikipedia:Wikiproject_geographical_conditions, downloaded from the Internet on Jan. 13, 2010, 17 pages.

International Search Report, PCT/US2010/22079, dated Apr. 20, 2010.

* cited by examiner

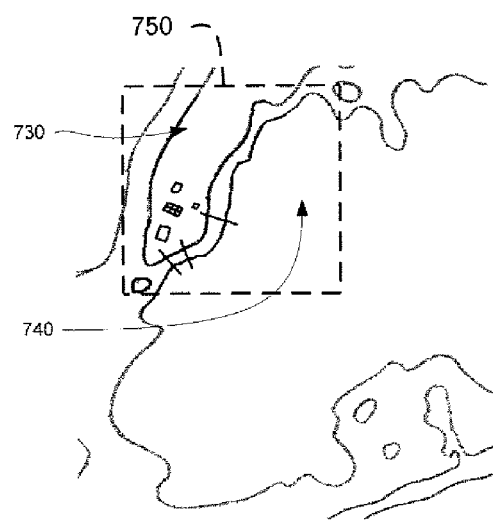 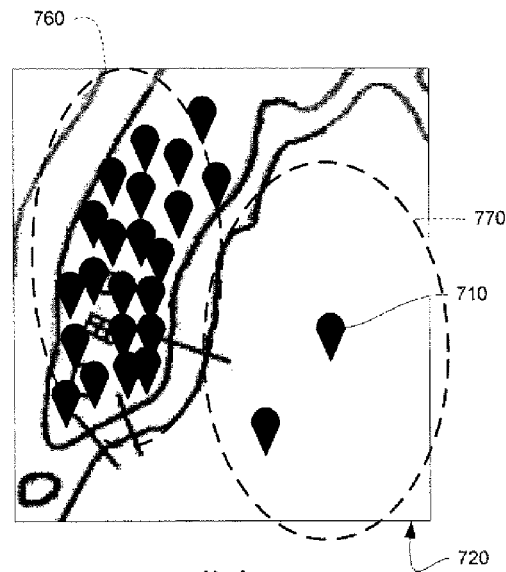
(a)     FIGURE 7     (b)
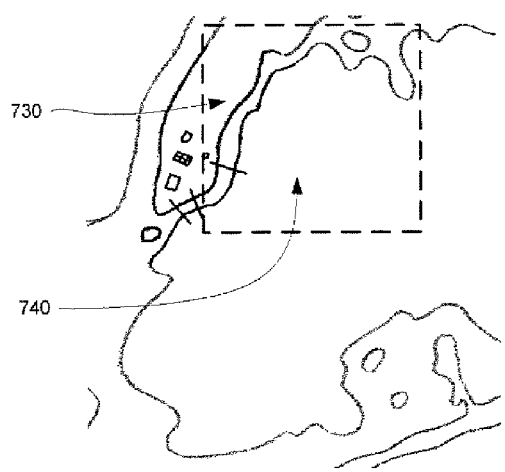 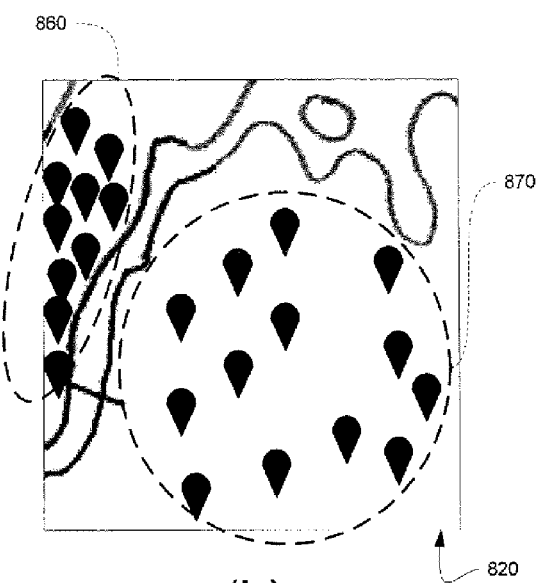
(a)     (b)
FIGURE 8

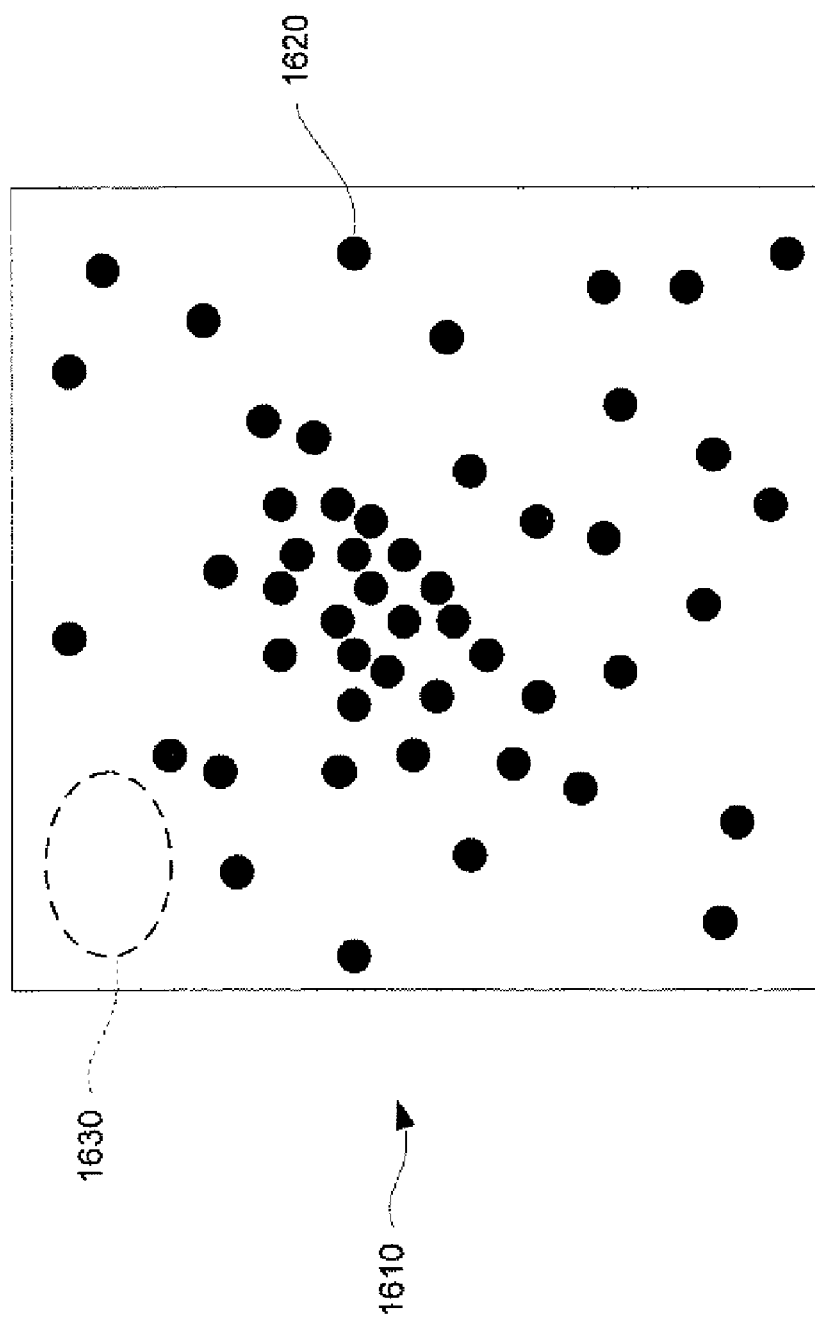

SYSTEM AND METHOD OF DISPLAYING SEARCH RESULTS BASED ON DENSITY

CROSS-REFERENCE TO RELATED APPLICATIONS

The U.S. patent application filed on the same date and listing the same inventors as this application and entitled "SYSTEM AND METHOD OF TRANSMITTING SEARCH RESULTS BASED ON ARBITRARY QUERIES", namely U.S. application Ser. No. 12/359,734, is hereby incorporated by reference.

BACKGROUND OF THE INVENTION

Services such as Google Maps (maps.google.com) allow users to conduct searches that are limited to particular geographic areas. For example, while viewing a street or satellite map of New York City on a web browser such as Google Chrome, a user may search for the word "pizza". In response, the servers cause the user's computer to display icons indicating the positions of listings that match the query, such as restaurants that have "pizza" in their name.

The results of the query may be sent in a way that permits a great deal of interactivity. For example, the map is sent as tiles of images and descriptions of the results and their positions are sent as text (such as data formatted as JSON (Javascript Object Notation) or HTML). This allows the user's computer to display icons on the map and a text listing of the results next to the map. Using Javascript provided by the server, the client computer can determine whether the user has clicked an area of the map occupied by an interactive icon and perform a number of actions in response, such as displaying a balloon containing even more information about the listing.

Google Maps also permits layers. For example, it is capable of showing icons for entries on Wikipedia.org that are associated with latitude/longitude coordinates matching the geographic area currently being viewed (e.g., http://en.wikipedia.org/wiki/Wikipedia:WikiProject_Geographica 1_coordinates). The icons of entries are sent as an image to be overlaid on the map, along with information relating to the entries. The information is sent in JSON with information identifying the entry's position on the map and an identification of the entry. The position information may be used by the user's computer to determine whether the user actuated the icon (such as by clicking it or hovering a mouse cursor over it) and the identification information may be used to obtain more information from a server if the icon is actuated. YouTube results may also be shown as a layer. These results are not filtered based on the query but, rather, show all entries in the area covered by the map.

Google Maps also features a "Places of Interest" layer that allows users to display icons associated with all businesses falling within certain pre-selected categories sent by the server, such as "Italian" and "Pizza" restaurants, banks, gas stations, and the like. Although the user may collectively display search results from the pre-selected categories and from searches based on custom search terms that are not pre-selected, the results are separate, i.e., the preselected category icons do not change based on the user-defined term and vice versa. For example, the user may check a box next to "pizza" and type in the term "vegetarian", in which case Google Maps combines and displays the search results together; however, the results associated with "pizza" are not selected based on the "vegetarian" query nor are the results associated with the "vegetarian" query selected based on the selection of "pizza" from the list. Sites such as www.tavern-oxoros.gr (showing many locations on a map in response to a user's selection of pre-selected categories) and www.smalltownbrooklyn.com (which may be capable of showing all businesses on a map) are similarly able to show all results associated with pre-selected categories.

BRIEF SUMMARY OF THE INVENTION

In one aspect, a method is provided that includes receiving a query, determining matching listings, selecting a plurality of the matching listings and providing a map. The listings comprise data identifying an object associated with a geographic location and information relating to the object, and a listing matches when its information corresponds with the query and its geographic location corresponds with the map area. The plurality of matches are selected based on the number of matching listings having geographic locations associated with a first portion of the map area relative to the number of matching listings having geographic locations associated with a second portion of the map area. The map is provided along with indications of the matching listings.

Another aspect provides a system of displaying a map. The system includes a user input device, a memory storing instructions and data representing different objects at different geographic locations, a processor in communication with the user input device so as to process information received from the device in accordance with the instructions, and a display in communication with, and displaying information received from, the processor. The instructions include: retrieving a map based on location information entered via the user input device; retrieving identifications of objects matching information entered via the user input, the retrieved identifications being less than all of the objects matching the information entered via the user input, the retrieved identifications being selected based on the density of matching objects within portions of the map and; displaying the identifications on the map on the display.

Yet another aspect provides a method of displaying a map covering a map area. The method includes: transmitting, from a first computer at a first node of a network to a second computer at a second node of the network, a location and words being arbitrarily selected by a user; receiving data representing a map and listings, the map covering an area and; displaying a map and listings on the map based on the data. The map data is selected by the second computer based on the location. The listings are selected by the second computer based on density criteria and whether a listing matched, where (a) a listing matched if one or more of the transmitted words is present in information associated with the listing and (b) the density criteria depended on the quantity of matching listings in one region of the map area relative to another region of the map area. In some aspects of the invention, all of the words must match.

A still further aspect provides a method of displaying a map. The method includes: transmitting, from a first computer at a first node of a network to a second computer at a second node of the network, a location and words arbitrarily selected by a user; receiving image data representing a map covering an area; receiving image data representing a first set of listings; receiving text data representing a second set of listings and; displaying a map and listings on the map based on the data. The method is such that the map data was selected by the second computer based on the location. Moreover, the method is such that the listings represented by the listing data were selected by the second computer based on density criteria and whether a listing matched, where (a) a listing matched depending on whether there was a correspondence between words associated with the listing and the transmitted words and whether there was a correspondence between a location associated with the listing and the map area, and (b) the density criteria depended on the quantity of matching listings in one region of the map area relative to another region of the map area.

Still another aspect relates to a system having means for receiving a query as well as means for determining matching listings, where a listing comprises data identifying an object associated with a geographic location and information relating to the object, and where determination of a match comprises determining whether the listing information corresponds with the query and the geographic location corresponds with the map area. The system further includes means for selecting a plurality of the matching listings based on the number of matching listings having geographic locations associated with a first portion of the map area relative to the number of matching listings having geographic locations associated with a second portion of the map area. Moreover, the system includes means for providing a map of the map area and indications of the matching listings, each indication being located on the map relative to its geographic location.

In yet another aspect, a method of displaying a map is provided. The method includes: transmitting, from a first computer at a first node of a network to a second computer at a second node of the network, a location and words arbitrarily selected by a user; receiving image data representing a map covering an area; receiving image data representing a first set of listings; receiving text data representing a second set of listings, the listings in the second set being different than the listings in the first set; and displaying the first and second set of listings on the map. The map data was selected by the second computer based on the location, and both sets of listings were selected by the second computer based on whether a listing matched. A listing is considered to match when there is a correspondence between words associated with the listing and the transmitted words and a correspondence between a location associated with the listing and the map area.

Non-limiting examples of image data includes data in a vector or bitmap format. Non-limiting examples of text data includes data formatted as JSON, XML or HTML.

Another aspect relates to a system having a memory storing data and instructions, a processor processing the data in accordance with the instructions, and a display in communication with, and displaying information received from, the processor. The instructions include receiving, over a network, image data representing a map covering an area, image data representing a first set of listings, and text data representing a second set of listings. The instructions also include displaying a map and listings on the map based on the data, where the map data was selected by a server based on the location. Moreover, the listings are selected by the server based on whether a listing matched, where a listing matches when there is a correspondence between words associated with the listing and the transmitted words and a correspondence between a location associated with the listing and the map area.

Yet a further aspect relates to a method of transmitting a map. This aspect includes receiving, at a first computer at a first node of a network from a second computer at a second node of the network, a location and arbitrary words selected by a user. It also includes using a processor at the second computer to select data representing a map of the location and listings. The listings are selected based on whether a description associated with the listing corresponds with the received words and whether a location associated with the listing corresponds with the received location. The method further includes transmitting the map data as image data and generating image data based on the selected listings, where each selected image is associated with an icon and where the positions of an icon corresponds with the location of the listings relative to the other listings. The method also transmits the image data based on the selected listings.

Still another aspect of the system comprises: means for transmitting, from a first computer at a first node of a network to a second computer at a second node of the network, a location and words arbitrarily selected by a user; means for receiving image data representing a map covering an area; means for receiving image data representing a first set of listings; means for receiving text data representing a second set of listings; and means for displaying the map, with the first set of listings and the second set of listings on the map based on the data. The system is such that the map was selected by the second computer based on the location and wherein the listings represented by the listing data were selected by the second computer based on whether a listing matched, where a listing matches when there is a correspondence between words associated with the listing and the transmitted words and a correspondence between a location associated with the listing and the map area.

BRIEF DESCRIPTION OF THE DRAWINGS

FIG. 7(a) illustrates the portion of the map displayed in FIG. 7(b).

FIG. 7(b) is an example of a map display showing a limited number of listings selected based on the displayed map area and their relevance to a user's query.

FIG. 8(a) illustrates the portion of the map displayed in FIG. 8(b), such portion being different than the portion illustrated in FIG. 7(a).

FIG. 8(b) is an example of a map display showing a limited number of listings selected based on the displayed map area and their relevance to the same query as FIG. 7(b).

FIG. 16 is an image of listings in accordance with an aspect of the system and method.

DETAILED DESCRIPTION

In one aspect, the system and method displays the results of a user's query on a map in a manner that indicates which areas are more densely populated with responsive listings. In order to reduce the processing needs of the client computer, some of the highest-scoring listings may be sent as text so as to be rendered as interactive icons whereas the remaining listings are sent as an image layer that may be overlaid the map.

Figure 1:
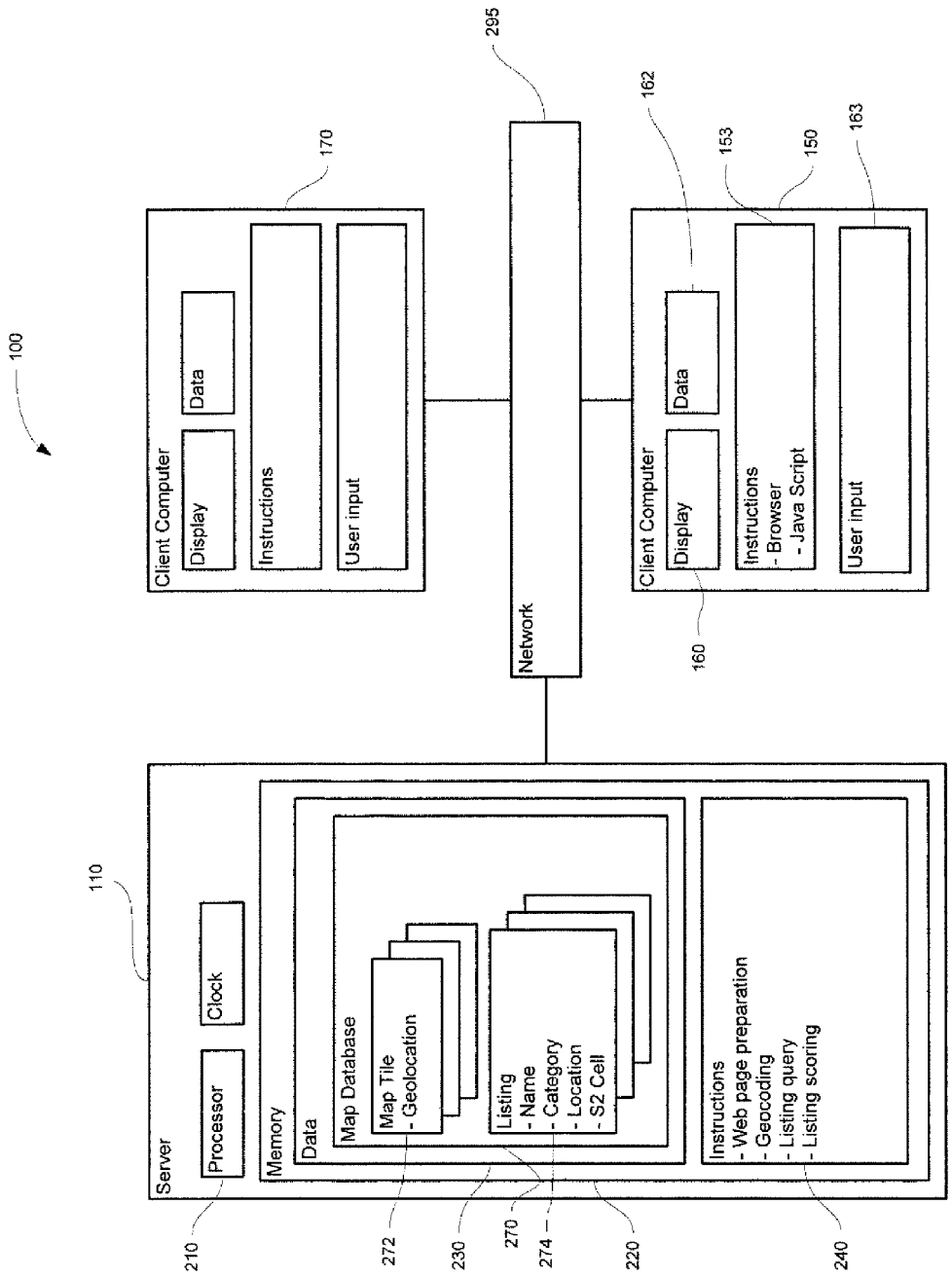
FIG. 1 is a block diagram of a system in accordance with an aspect of the system and method.
Figure 2:
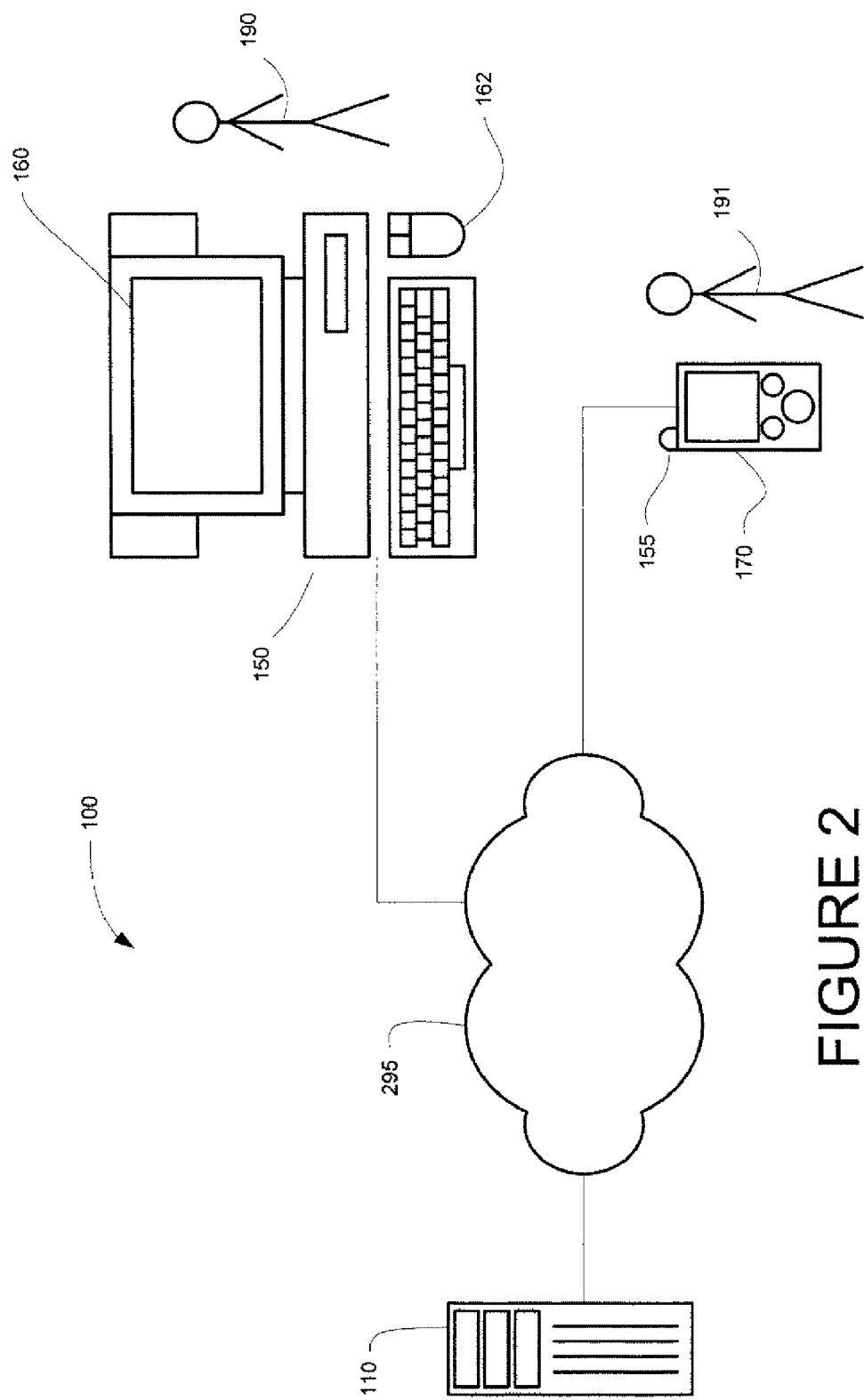
FIG. 2 is a schematic diagram of a system in accordance with an aspect of the system and method.

As shown in FIGS. 1-2, a system 100 in accordance with one aspect includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 210 may be any well-known processor, such as processors from Intel Corporation. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 150, 170. Each client computer may be configured similarly to the server 110, with a processor, memory and instructions. Each client computer 150, 170 may be a personal computer, intended for use by a person 190-191, having all the internal components normally found in a personal computer such as a central processing unit (CPU), display 160 (for example, a monitor displaying information processed by the processor), CD-ROM, hard-drive, user input device (for example, a mouse, keyboard, touch-screen or microphone), speakers, modem and/or network interface device (telephone, cable or otherwise) and all of the components used for connecting these elements to one another and permitting them to communicate (directly or indirectly) with one another. Moreover, computers in accordance with the systems and methods described herein may comprise any device capable of processing instructions and transmitting data to and from humans and other computers including network computers lacking local storage capability.

Although the client computers 150 and 170 may comprise a full-sized personal computer, many aspects of the system and method are particularly advantageous when used in connection with mobile devices capable of wirelessly exchanging data with a server over a network such as the Internet. For example, client computer 170 may be a wireless-enabled PDA such as a Blackberry phone or an Internet-capable cellular phone. In such regard, the user may input information using a small keyboard (in the case of a Blackberry phone), a keypad (in the case of a typical cell phone), a touch screen (in the case of a PDA) or any other means of user input.

Client computers 150 and 170 may include a component, such as circuits, to determine the geographic location of the device. For example, mobile device 170 may include a GPS receiver 155. By way of further example, the component may include software for determining the position of the device based on other signals received at the mobile device 150, such as signals received at a cell phone's antenna from one or more cell phone towers if the mobile device is a cell phone.

The server 110 and client computers 150, 171 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various combinations of devices and communication protocols including the Internet, World Wide Web, intranets, virtual private networks, wide area networks, local networks, cell phone networks, private networks using communication protocols proprietary to one or more companies, Ethernet, WiFi and HTTP. Such communication may be facilitated by any device capable of transmitting data to and from other computers, such as modems (e.g., dial-up or cable), networks and wireless interfaces. Server 110 may be a web server.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Map database 270 of server 110 stores map-related information, at least a portion of which may be transmitted to a client device. For example, map database 270 may store map tiles 272, where each tile is a map image of a particular geographic area. Depending on the resolution (e.g., whether the map is zoomed in or out), a single tile may cover an entire region, such as a state, in relatively little detail. Other tiles may cover just a few streets in high detail. The map information of the system and method are not limited to any particular format. For example, the images may comprise street maps, satellite images, or a combination of these, and may be formatted as vectors (particularly with respect to street maps) or bitmaps (particularly with respect to satellite images). The various map tiles are each associated with geographical locations, such that the server 110 is capable of selecting, retrieving and transmitting one or more tiles based on a receipt of a geographical location or range of geographical locations.

Map database 270 may also store listing information identifying businesses or other objects or geographic features associated with particular geographic locations. For example, each local business 274 may be associated with a name, a category (such as "pizza, Italian restaurant" or "ballpark"), other information (such as store hours and food on a menu) and a location. The location may be expressed in different forms, such as a text-based street address ("1600 Amphitheatre Parkway, Mountain View, Calif.") or a latitude/longitude position (such as latitude 37.423021 and longitude −122.083739). Multiple descriptions may also be stored for the business's address as well, such as storing both the street address and latitude/longitude position. The database may be compiled by automatically gathering business information (such as from websites or telephone directories), or users may enter or edit the local business records themselves via web pages served by the server 110.

In many cases, there will be a single listing 274 in the map database 270 for each different business. However, it will be understood that the same business may be associated with many different listings, and that a single listing may be associated with many different businesses.

Listings may include other geographically-located objects in addition to or instead of businesses. For example, they may also identify homes, landmarks, roads, bodies of land, the current position of a car, items located in a store, etc. Therefore, references to business listings will be understood as examples only, and not a limitation on the type of listings that may be the subject of the system and method.

In one aspect of the system and method, each listing is also allocated to one or more geographic regions referred to as "region cells." For example, the earth may be considered divided into individual regions of various levels and sizes. At the highest level, the earth may be considered divided into four region cells: two north of the equator and two below. At the second highest level, these cells (such as the cell north of the equator and east of the Prime Meridian) may be subdivided into another four cells. At the third highest level, each of the cells in the second highest level may be divided into yet another four cells. This may continue until the desired number of levels of region cells have been achieved (it is not necessary that the earth start with, or each level be divided by, four cells).

Thus, any particular point on the earth will be contained in many different region cells: one for each level. Similarly, each region cell is associated with a geographic area.

Map database 270 may store, for each listing 274, the region cells in which the listing resides. For example, a Manhattan pizzeria will be associated with many cells, including both (1) a large region cell comprising all of the Northern hemisphere east of the Prime Meridian and (2) a much smaller region cell that includes only a neighborhood of Manhattan. Alternatively, a listing's applicable region cells may be determined on demand as needed, such as after a query is received.

Figure 3:
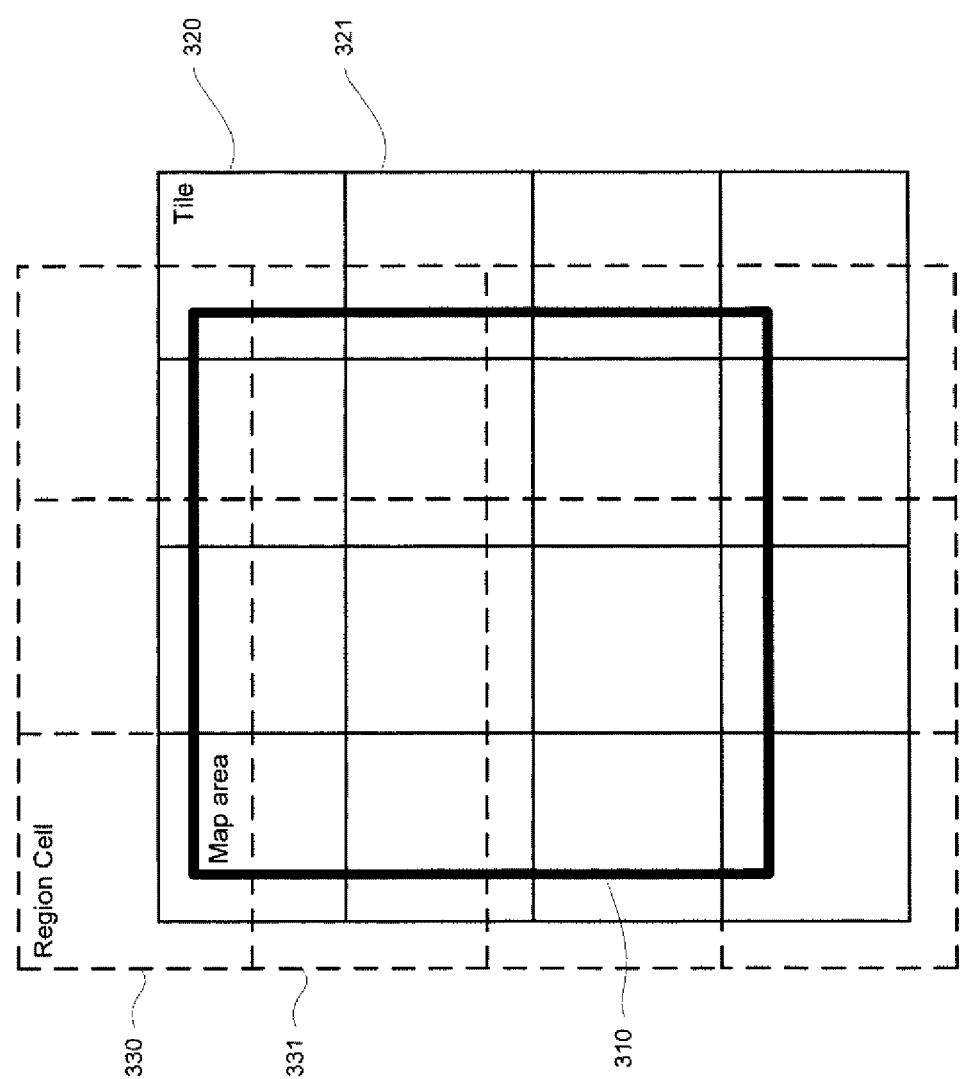
FIG. 3 is a representation of the relationship among a map area, map tiles and regions in accordance with an aspect of the system and method.

FIG. 3 illustrates how the boundaries of a map area, region cell and tile may relate to one another. Block 310 (thick solid lines) represents the map area to be displayed. Blocks 320-321 and other boxes defined by thin solid lines represent the individual map tiles that are sent to, and stitched together by, the client computer to show the map. Boxes 330-331 and other boxes defined by dashed lines represent one level of region cells associated with the map area. Although the edges of the map area, tiles and region cells may not line up perfectly with one another, each is associated with a particular geographic position and, thus, their position relative to one another is known.

Figure 18:
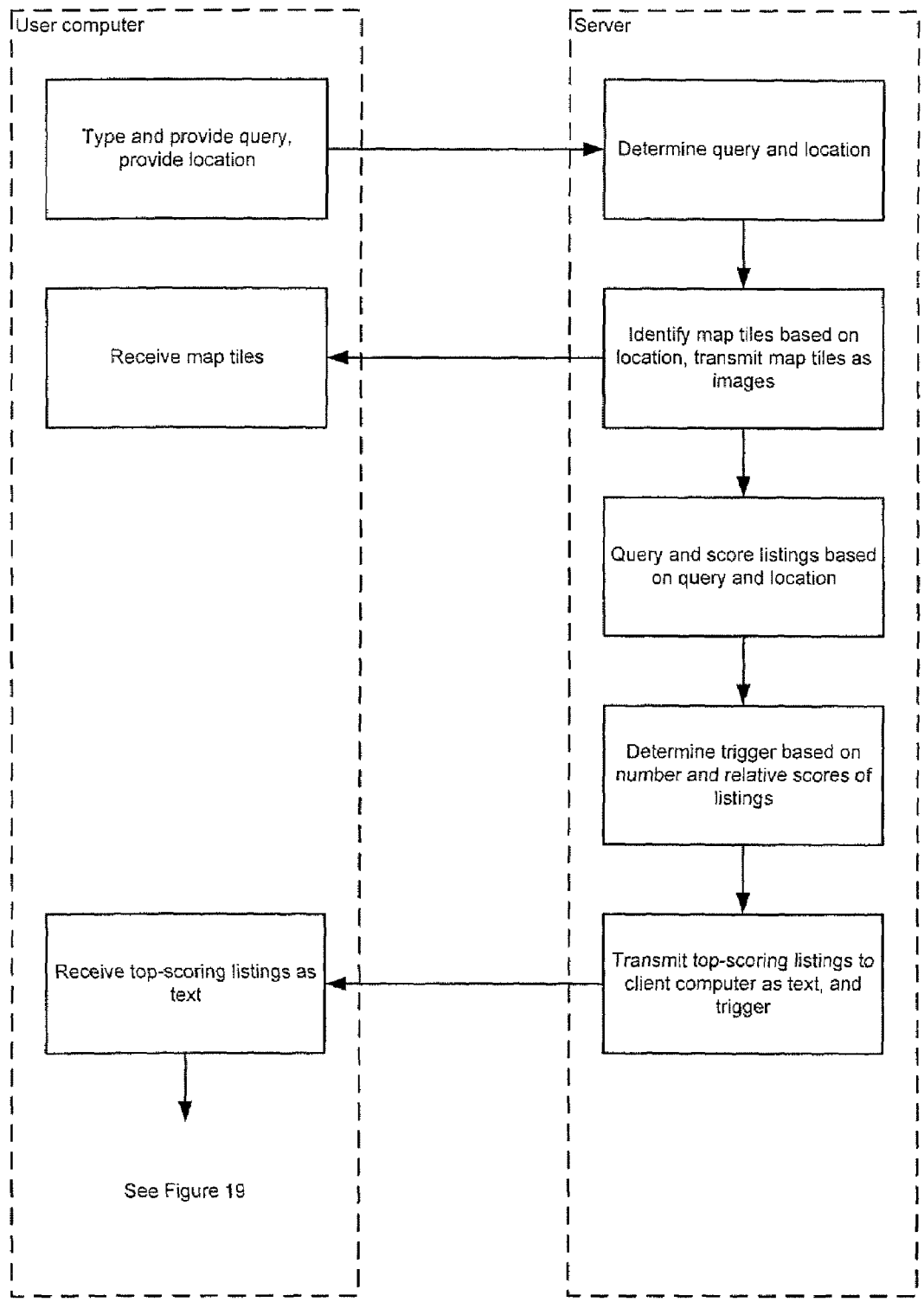
FIG. 18 is a flowchart in accordance with an aspect of the system and method.
Figure 19:
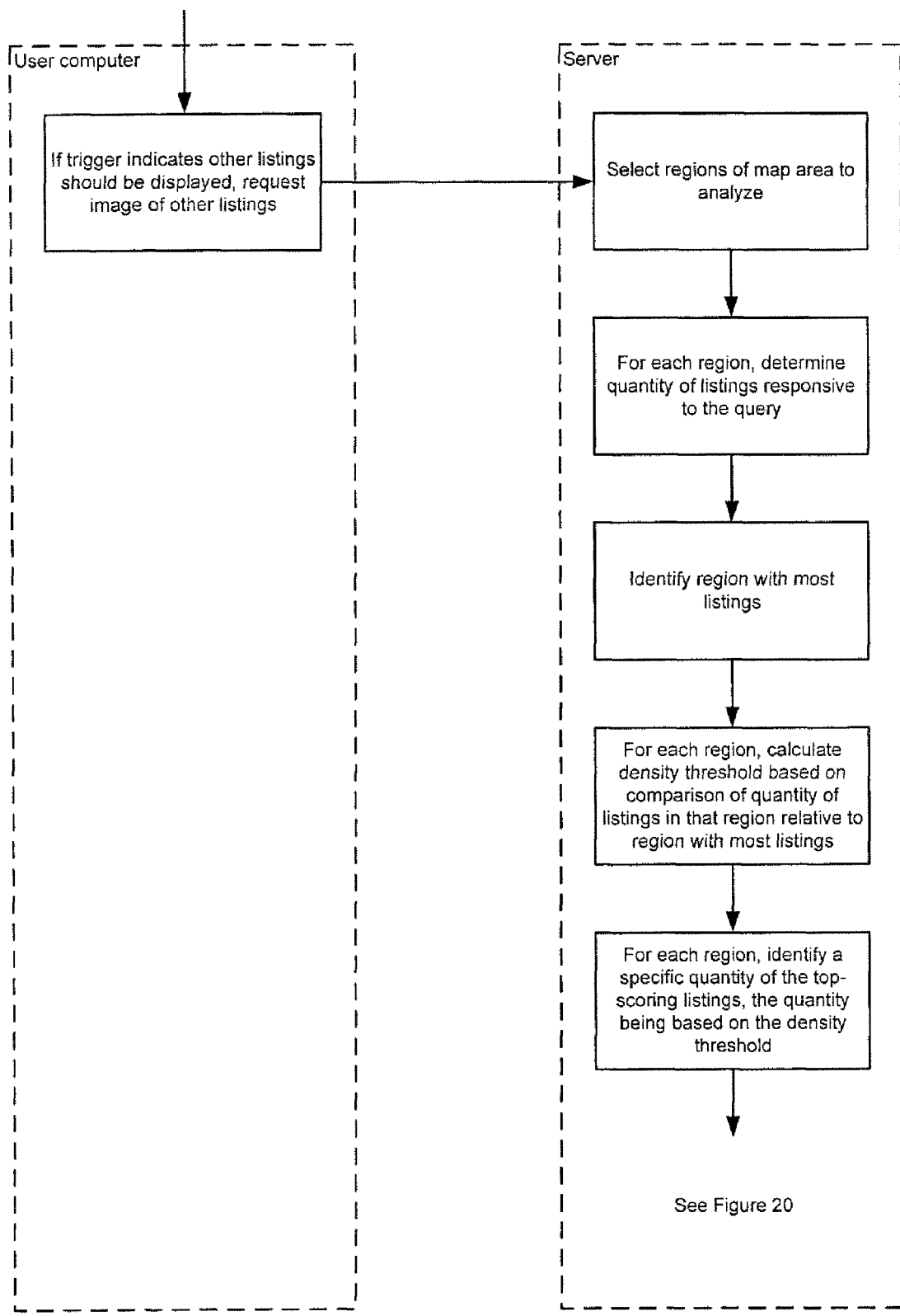
FIG. 19 is a flowchart in accordance with an aspect of the system and method.
Figure 20:
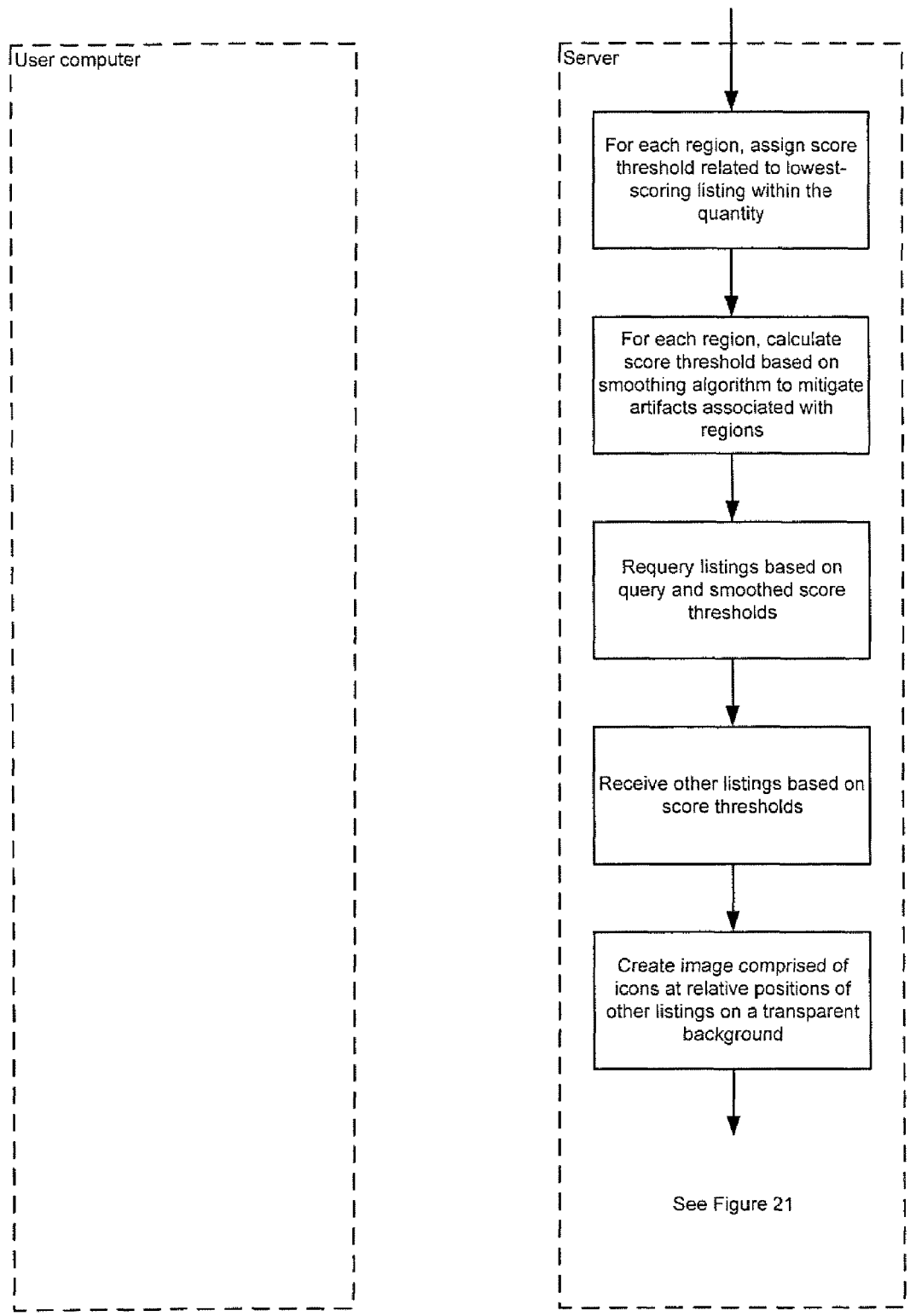
FIG. 20 is a flowchart in accordance with an aspect of the system and method.
Figure 21:
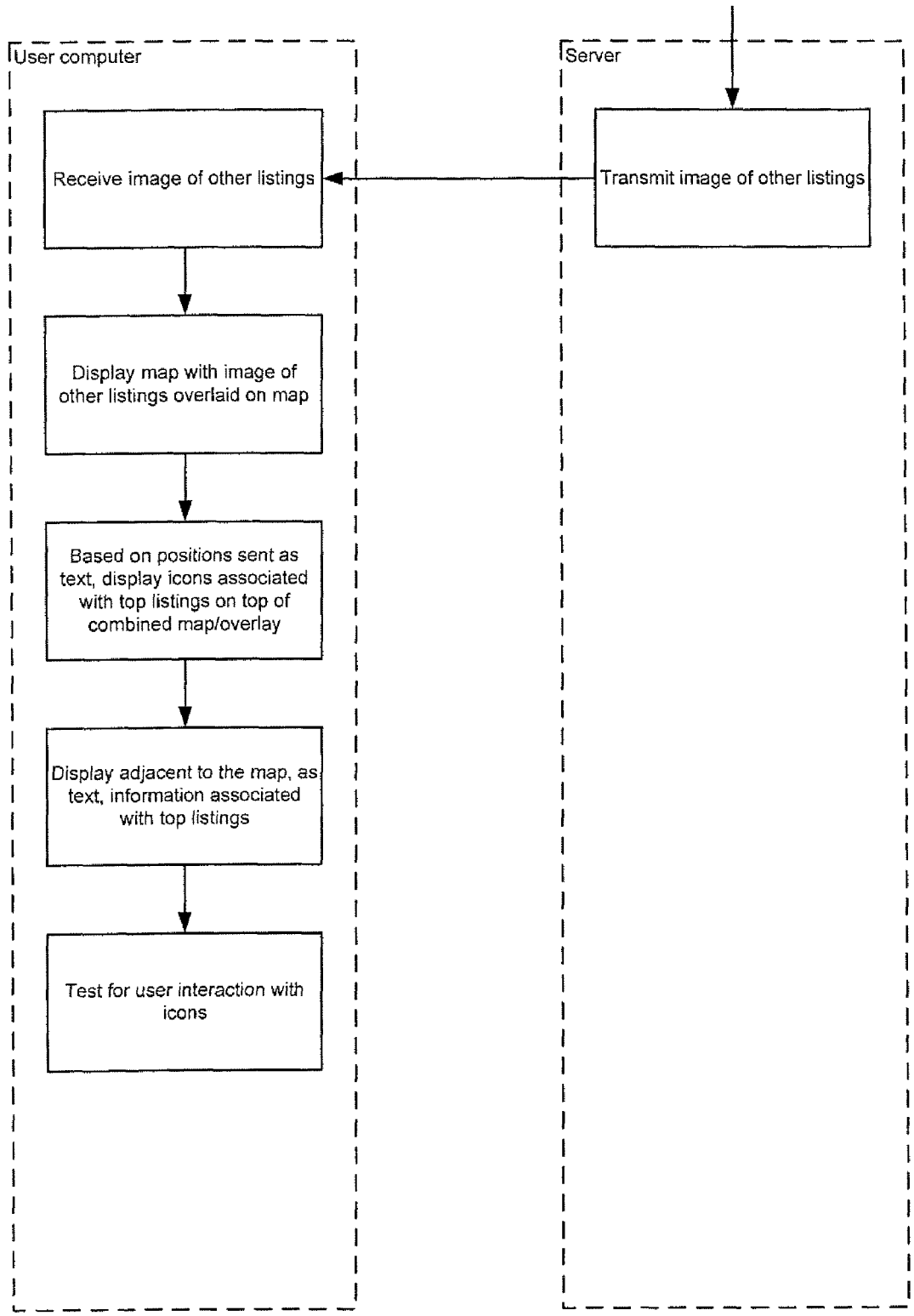
FIG. 21 is a flowchart in accordance with an aspect of the system and method.

In addition to the operations illustrated in FIG. 18, various operations in accordance with a variety of aspects of the system and method will now be described. It should be understood that the following operations do not have to be performed in the precise order described below. Rather, various steps can be handled in reverse order or simultaneously.

Figure 4:
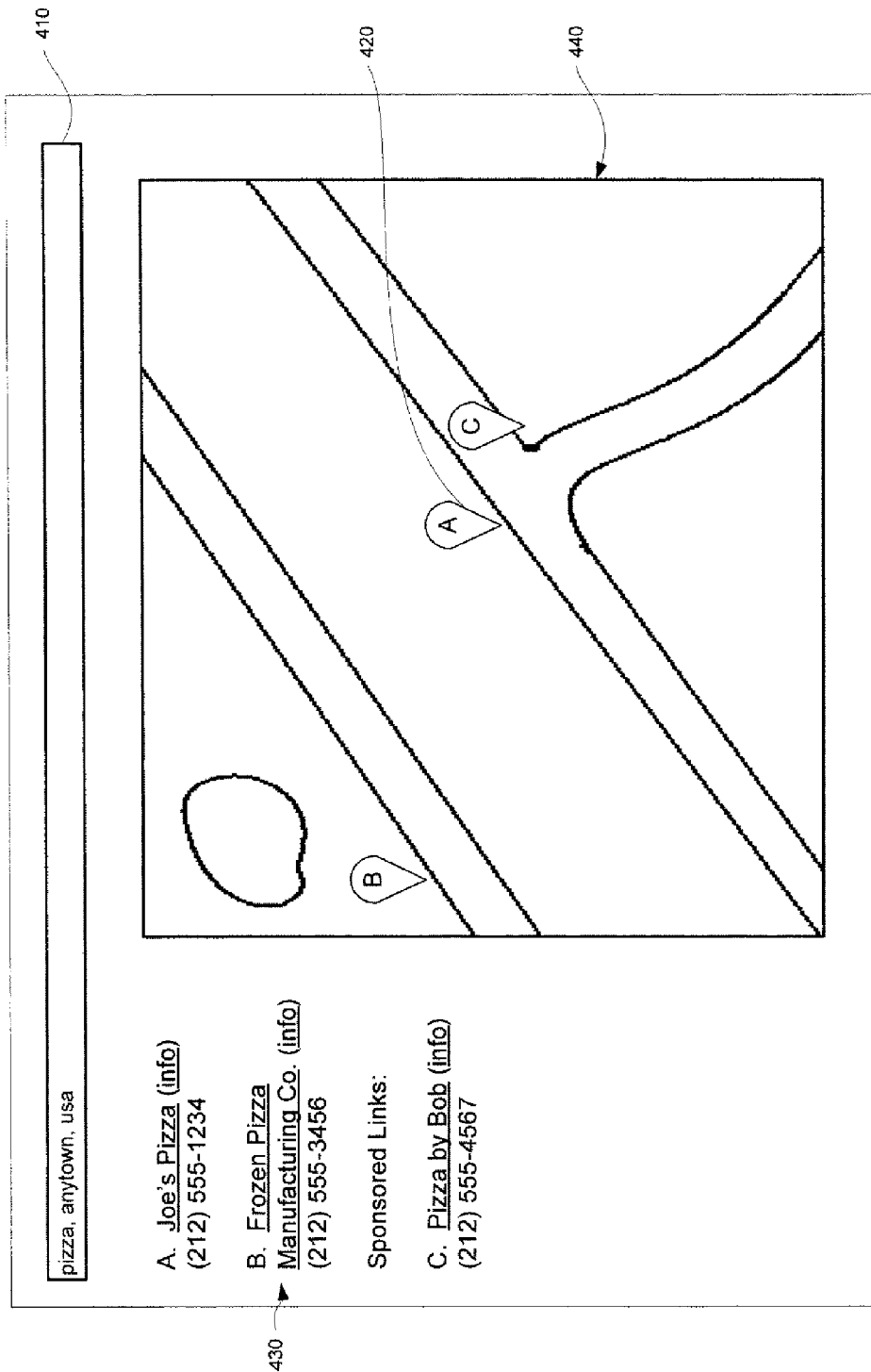
FIG. 4 is a screen shot of a map and a set of listings in accordance with an aspect of the system and method.

FIG. 4 illustrates a screen shot of a map being viewed by a user. For example, the system and method may be implemented in connection with an Internet browser such as Google Chrome displaying a web page showing a map and other information.

The user may perform a search for listings associated with a particular location by entering a query. For example, a user may provide the server with a search term or terms (such as "pizza") and location (such as "nyc") by typing "pizza nyc" in textbox 410 to search for pizza-related businesses in New York City. (The fictional town "Anytown" is used in FIG. 4 by way of example.)

In one aspect of the invention, the query includes arbitrary words selected by the user. For example, rather than restricting the user to a pre-defined list of search terms or types, the user may use their keyboard to type any word or words they like, a letter at a time.

The user may also select a particular geographic area by using a mouse, keypad or other user input device to pan and zoom as desired. The query may be provided in other formats as well, such as by providing audio and images.

In response to the user's query, the server may send not only an image of the map 440, but the results of the search. Rather than drawing the responsive listings on the map and then sending the map, the server 110 sends a description of the listings and its location to the client 150. This allows the user computer to easily permit interaction with the listings, such as drawing an icon 420 that responds to clicking. It may also show the listings as text 430 in a separate location adjacent to the map 440.

Figure 6:
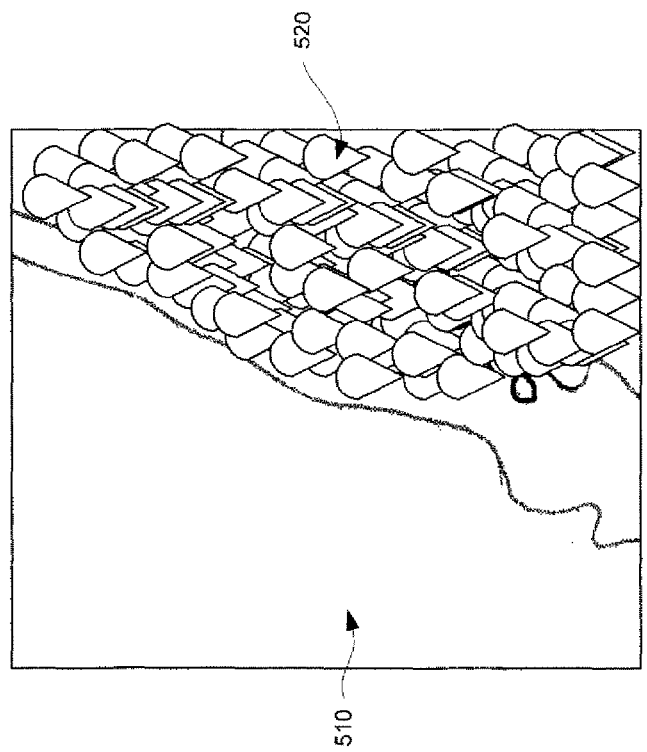
FIG. 6 is an example of a map display showing all responsive listings.
Figure 5:
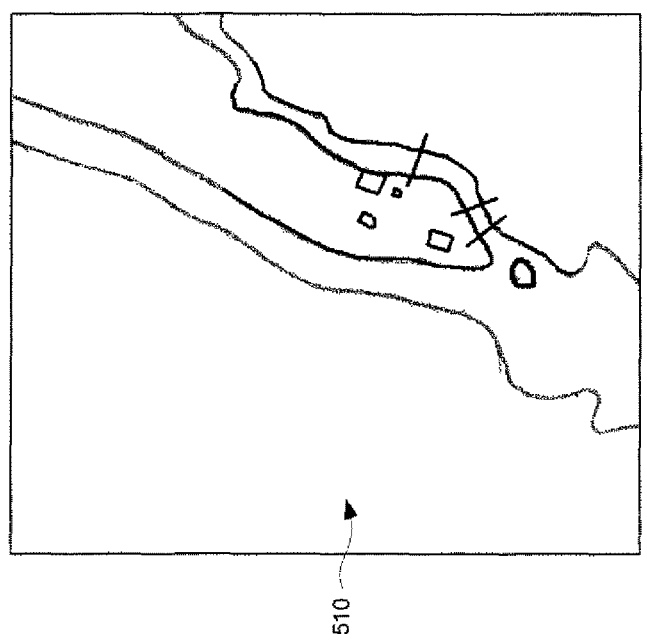
FIG. 5 is a map display prior to showing listings in accordance with an aspect of the system and method.

If a large number of listings are returned, the system and method may display them all. However, the icons used to display the listings on the map may overlap so extensively that it unacceptably obscures the map. For example, FIGS. 5 and 6 show how a map 510 of New York City may look before and after (respectively) a search for "pizza nyc" if icons 520 were shown for every listing that had "pizza" in its name and was located in New York City.

Moreover, many client computers will be unable to acceptably process and display hundreds of listings. For example, if the client computer was a relatively low-powered low-memory device such as a cell phone, and the listings were sent as a text-based file such as JSON or XML, the client computer may have a great deal of difficulty quickly drawing all of the listings and quickly repositioning the listings if the user pans the map. There may be tens of thousands of restaurants selling pizza in New York City.

As noted above in the Background section, only a certain number of responsive listings may be sent to reduce visual clutter or processing requirements on the client computer. FIG. 7(b) illustrates one possible result if the top 25 scoring pizza listings (shown as black pins such as pin 710) were shown on a map 720 that included all of very densely-populated Manhattan 730 and some of less-densely populated Brooklyn/Queens 740. Block 750 of FIG. 7(a) illustrates the outlines of map 720 relative to the rest of New York City. Because of the disparity in density, the number of listings 760 shown in Manhattan (22 listings) will greatly outnumber the listings 770 in Brooklyn/Queens (2 listings). This conveys the impression that Manhattan is extremely and densely packed with high-scoring listings whereas Brooklyn/Queens has relatively few high-scoring listings.

If the view of New York City were panned to include much more of Brooklyn/Queens and much less of Manhattan as shown in FIG. 8 and the top 25 scoring listings within the map 820 were shown, it is expected that more Brooklyn/Queens listing would be shown and less Manhattan listings would be shown. One possible result in shown in FIG. 8(b). However, because the set of listings that are queried changed (only a portion of Manhattan now appears in map 820 and more of Brooklyn/Queens), the top-scoring listings 860 may change dramatically. For example, the listings 860 in Manhattan may look far less densely packed than the listings 760 in Manhattan in FIG. 7(b). Moreover, while the listings 860 in Manhattan still appear more densely packed than the listings 870 in Brooklyn/Queens, the difference between neighborhoods is far less stark in FIG. 8(b) than FIG. 7(b). A user viewing map FIG. 8(b) would have a far different impression of the difference between Manhattan and Brooklyn/Queens, when it comes to how closely the listings are packed together, than a user viewing map FIG. 7(b).

In one aspect of the system and method, listings are selected in response to the query based at least in part on the listing's geographic proximity to other listings. For example, if the listing is in a geographic area that is dense with other listings, the listing is more likely to be displayed.

In that regard, the system and method compares the number of listings in one geographic area (such as Manhattan) against another geographic area (such as Brooklyn) to be displayed, and selects a portion of the listings based on the difference. In other words, if Manhattan had twice as many listings as Brooklyn, then twice as many listings would be shown in Manhattan as Brooklyn.

Moreover, the listings may be selected based on how well the listings correspond with the query. For example, if the system were to simultaneously show 30 listings in a map containing both Manhattan and Brooklyn, and there were twice as many responsive listings in Manhattan than Brooklyn, then the top 20 best-matching listings of Manhattan would be shown in Manhattan and the top 10 best-matching listings of Brooklyn would be shown in Brooklyn. In other words, even though the map was showing both Manhattan and Brooklyn, it would still show 10 matches in Brooklyn even if all of the top 100 listings were in Manhattan. Similarly, it would still show 20 matches in Manhattan even if all of the top 100 listings were in Brooklyn.

Showing more listings can help convey a greater sense of the distribution of listings. However, as noted above in connection with FIG. 6, it may be difficult for a client computer to show a large number of listings on a map even if the listings have been selected based on density. While the listings could be drawn directly on the map and sent to the client, the client computer may not be able to provide the user with the same interactivity as if the listings were sent in text as described in connection with FIG. 4.

One aspect of the system and method uses the server to position some of the listings on an image and the client computer to position some of the listings by providing the listing and map information in a variety of formats.

Figure 9:
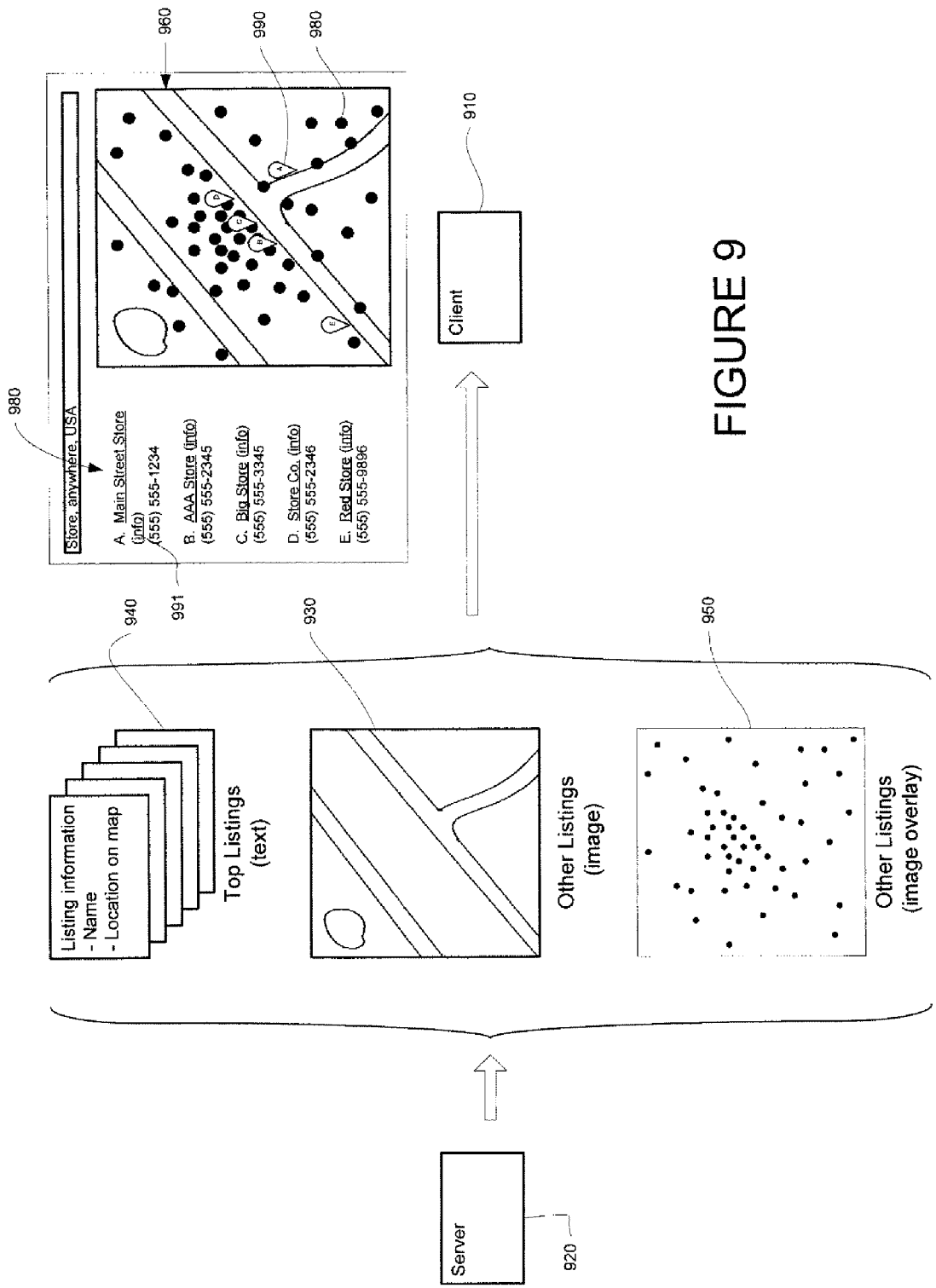
FIG. 9 is a flow chart in accordance with an aspect of the system and method.

As shown in FIG. 9 and in response to a query from the client computer 910, server 920 transmits an image 930 of a map (such as a bitmap or vector-based tiles), information 940 (such as a text-based HTML, JSON or XML file) describing some of the information identifying the top listings, and an image 950 of other listings for the client computer to overlay on the map image 930. The processor of the client computer 910 receives and processes this information to create and display a single image 960.

For example, the client computer may display the map 960 in a web browser, and uses the information contained in the listing information 940 to determine the position of, and render, user-actuable icon 990 on the map 930, and also display the information as text 991 next to the map. In one aspect, listings are selected to be sent as text based on their likelihood of being of interest to the user.

The client computer 910 also overlays the image 950 of other listings on the map, thus allowing the user to see an indication 980 of other listings beyond those contained in the listing information 940. Like the listings contained in listing information 940, these listings are also responsive to the user's query. Moreover, they may be selected to be reflective of density as discussed above.

Because the image of other listings was rendered by the server, and in one aspect of the system and method, the client computer need not calculate or even be aware of the location of the listings on the overlay. Rather, because they are already positioned by the server 920 on the overlay, the client computer 910 can quickly display the other listings on top of the map 930. Moreover, even if there are hundreds of other listings to be shown on the map, the client computer has no need to receive or process their locations, or display or test for their actuation individually. This aspect of the system and method may be particularly advantageous in connection with devices having limited user input or processing power.

This aspect of the system and method advantageously makes a variety of features simultaneously available without overburdening the processor of the client computer. By way of example, if "pizza" were queried while the user was viewing a densely populated area such as New York City, the image overlay 950 allows the user to see that there are many listings responsive to the user's query. In addition, when the server selects the listings in the overlay 950 based on density as described above, the user can also see where the greatest concentration of listings are, which can be very valuable when determining areas that the user may want to visit. Both sets of listings are selected at least in part on a query containing arbitrary words provided by a user rather than pre-selected categories or terms provided by the server.

This aspect also has the advantage of allowing the user to greatly interact with the listings. For example, the client computer may actuate icon 990 associated with listing 991 by clicking it. Clicking the icon may bring up more information (such as displaying a balloon containing more information like an address and photo). Similarly, clicking text listing 991 may highlight the listing's associated icon 990 on the map. Accordingly, the listings that are likely to be of greatest interest to the user remain highly interactive.

One possible system and method for selecting listings based on the user's arbitrary query, the density of the listing, and processing the image overlay of listings will now be described by way of example and not by limitation.

As shown in FIGS. 1-2, user 190 causes a web browser program on client computer 150 to connect to web server 110 over network 295. Server 110 sends the browser with a web page containing Javascript. The processor of the client computer executes the Javascript instructions, which include requesting the server for an initial map at a particular location. The initial location may be identified any number of ways, including using the last location viewed by the user, having the server select a default location, appending the location to the URL used to log into the server, and many others. The system and method is not limited to any particular method of identifying the location.

The user may then enter a query into the web browser, which is transmitted to the web server. After the query is received from client computer 150, server 110 determines whether the query is associated with a location and, if so, where that location is. For example, if the query is "pizza nyc", the server determines that the "nyc" portion of the query pertains to a location and may proceed to determine the latitude/longitude position of the location. In that regard, the portion associated with a location may be passed to a geocoding routine, which converts addresses (like "1600 Amphitheatre Parkway, Mountain View, Calif.") into geographic coordinates (like latitude 39.423021 and longitude −122.083939). Similarly, it may convert "nyc" into the latitude/longitude of the center of New York City.

In addition to determining a latitude/longitude or similar position, server 110 also determines how much of the geographic area to display. For example, a request for specific street address may cause server 110 to select a location rectangle that includes an area roughly a mile square and centered around the address. Similarly, if the user identifies only a city such as "nyc", the server may select a location rectangle that bounds all of New York City. The size of the location rectangle may be determined by other factors as well, such as by using the current zoom level of a user's map (assuming the user is currently viewing a map).

If no location is found in the query, the server may assume that the user is searching for listings in or near the geographic area last viewed by the user. In this case, the server may select a location rectangle commensurate with the geographic area currently viewed by the user. Other shapes may also be used. For example, surfaces of spheres such as the earth are not strictly rectangle and, therefore, other shapes may be selected if a rectangle is considered insufficient. For example, other four-vertex shapes, polygons and curved shapes may be used as well in lieu of rectangles.

The location rectangle may also be affected by the desired zoom level. For example, if the user was viewing a map at the time the user performed the search, the server may use that currently-selected zoom level to determine the location area.

Processor 210 of server 110 queries the listings 294 using the user's query (e.g., "pizza") and location rectangle (e.g., a rectangle having four corners at different latitude/longitude positions and bounding all or most of New York City). The server then proceeds to look for matches, such as any listing that is in or relatively near the location rectangle and includes the requested term (e.g., "pizza"), variants thereof (e.g., "pizzeria"), terms that are known to be highly related (e.g., "parlor") or otherwise corresponds with the user query in a manner defined by the system and method as indicating a match. Listings considered a match may hereafter be referred to as, inter alia, "responsive listings".

Server 110 determines a score for the responsive listings. By way of example, the score may be a value related to the likelihood of the listing being of interest to the user. A relatively high score may indicate a relatively high likelihood of interest and relatively low score may indicate a relative low likelihood of interest. The scores may be based on any number of factors and formulas, such as assigning a positive or negative value to various characteristics and summing the values. Although a few characteristics are set forth below, the following characteristics are not required in all aspects of the system and method. Moreover, other characteristics may be used as well.

Some characteristics of a score may depend on a comparison of the listing to the query. For example, a very high value may be added to the score when a word in the user's query perfectly matches a word in the listing's name or category (e.g., the user is searching for "pizza" and the name of the business is "Joe's Pizza"). A lower value may be added to the score if the user's term partially matches other information in the listing (e.g., the user is searching for "pizza" and the business is a ballpark that happens to mention serving "pizza burgers" somewhere on its website).

In one aspect, the score may also change depending on the listing's proximity to the user's requested location. For example, a very high value may be added to the score if the user provided a street address and the listing's street address is precise match. A lower value may be added if the user provided a city name and the listing's address is in a neighboring city.

The score may also depend on information unrelated to the specific query. For example, if the listing has been viewed by many different users in the past, a high value may be added to the score. If the listing has been shown many times to other users in the past but rarely selected, a lower value may be added to score.

Some scores may be so low that the server may decide that no further processing of the listing is necessary. In that regard, certain listings may be considered irrelevant even though the listings matched the query to some extent.

The server may select a certain number of the top-scoring listings for transmission to the client computer. For reference purposes only, such listings may be referred to herein as "top listings", it being understood that the top listings may be selected on bases other than being in the highest scoring listings.

The responsive listings are then analyzed based on their score. For example, the server may create two histograms where the first histogram stores the listings having names or categories matching the user's query (or some other criteria considered to be highly-indicative of predicting the user's interest in the listing). The second histogram may contain listings having other elements, such as reviews or web pages, that matched the user's query.

Each histogram, in turn, is divided into bands comprising ascending or descending ranges of scores. Each listing is sorted into the appropriate band of the appropriate histogram.

The servers also analyze the score of the responsive listings to determine whether listings beyond the top listings should be shown. For example, if there are few results in the high-score histogram and many results in the low-score histogram, the server may decide that a user is unlikely to be interested in the remaining listings and set a trigger to "false". If there are many results in the high-score histogram, or few results in the high-score histogram but many results in the low-score histogram, the trigger may be set to "true."

The results of the analysis may be transmitted to the client computer for processing or evaluation. For example, server 110 may create an HTML or JSON file describing the top listings.

The description of the top listings may be sent to the client computer as text, and provide the client computer with at least enough information to show the listing on the map. In one aspect, the information includes the listing's name, street address, and phone number. It may also include a list of clickable regions on the map that are associated with the listings as well as information about what happens when the regions are clicked (such as instructions to pop up a bubble displaying more information about the listing associated with the region). In another aspect, the top listing information may include information identifying where the client computer may find more information about the listing on the server 110 or Internet generally. In yet another aspect, this information may be sent at separate times in different files (e.g., a first JSON file identifying relatively little information about the listing, and then a second JSON file in response to the client computer indicating that it is ready for the information).

Server 110 transmits the text-based information of top listings to client computer 150 over network 295.

Server 110 further selects and transmits tiles 292 from map database 290 based on the location area to be shown to the user. Based on zoom level, it may retrieve all tiles having a latitude/longitude position that indicates it corresponds with the latitude/longitude boundaries of the location area. It may also transmit neighboring tiles so as to prevent a request for new tiles if the user pans the map somewhat.

If the client computer receives an indication that it should show listings beyond the top listings, the client computer prepares to displays those listings. For example, and in accordance with the Javascript instructions sent by server 110 but executed by client computer processor 150, the client parses the JSON file for the trigger.

If the trigger indicates that other results should be displayed, the client computer instantiates a graphic layer to be displayed between the map layer and the layer used to display icons for the top listings. It further makes a request for an image representing the other results.

Upon determining that the client computer will display other listings beyond the top listings, the server selects listings that are both responsive to the user's query (such as "pizza") and reflective of density.

Server 110 compares the listings in different geographic areas of the map area in order to select listings in proportion to density. For example, the server may use the region cells to analyze the map area and select a level of region cells that is appropriate in view of the map area. The server may use the zoom level as a basis for selecting the appropriate region cell level so that smaller region cells are used when the map zoomed in; thus, changing the zoom may change which listings are selected for display.

Figure 10:
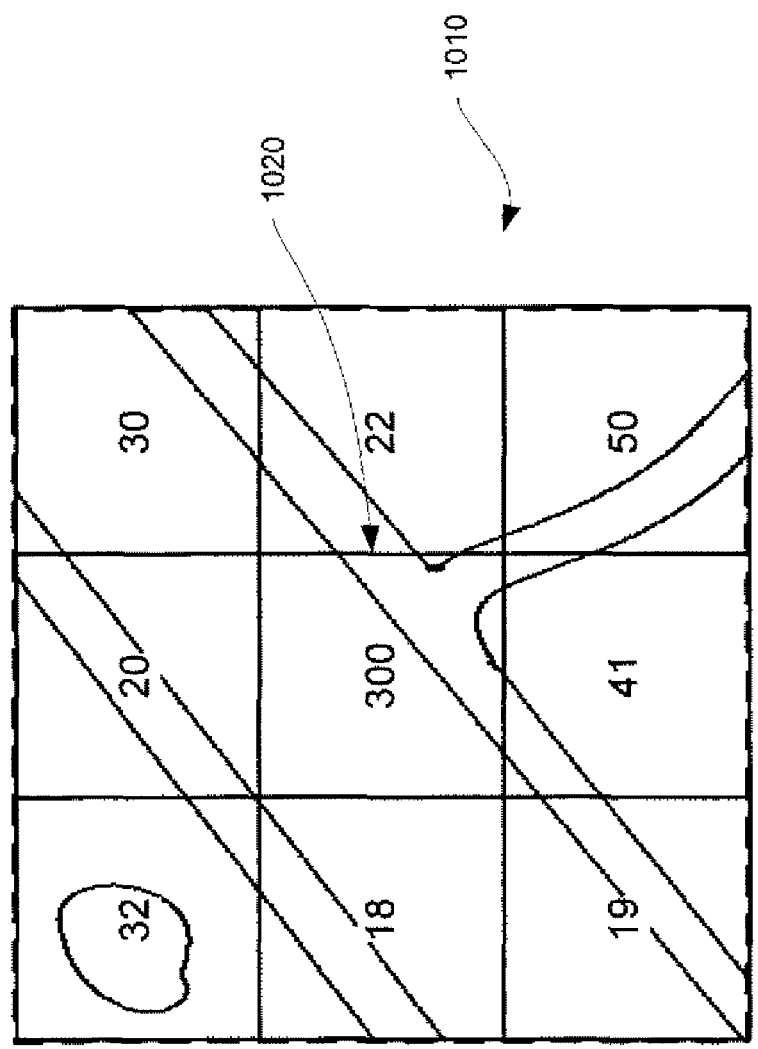
FIG. 10 illustrates the number of responsive listings in regions of a map in accordance with an aspect of the system and method.

The geographic area with the greatest density may be used to determine the amount of listings that will be shown in all of the geographic areas. For example, for each region cell covering the map area, the server may determine the number of responsive listings in each cell. FIG. 10 shows a map 1010 divided into 9 cells (represented by dashed lines), where the number within each cell indicates the number of responsive listings in the cell. For example, the North-West portion of the map contains 32 responsive listings, whereas the middle of the map contains 300 responsive listings.

The geographic area with the greatest number of listings is then identified. If each of the region cells are relatively the same size, the region cell with the greatest number of listings will be the cell the greatest density. Thus, as shown in FIG. 10, the center tile 1020 is identified as having the greatest density because it has more listings (300) than another cell of the map.

Based on the most crowded geographic area, a threshold is then calculated for each area where the threshold is used to determine how many listings will be shown in that area. For example, one possible equation for calculating such a threshold is:

$$\text{density\_threshold}(C) = d*(1+\text{density}(C)/\text{max\_density})$$

where:
C=a reference to a particular region cell;
density_threshold(C)=the maximum number of listings that will be shown in cell C;
d=a constant used to set the maximum number of listings that may be shown in any cell (it may be selected automatically or based on visual experimentation);
density(c)=the number of listings contained in cell C; and
max_density=the number of listings contained in the cell with the most listings.

The foregoing equation causes high density areas to have higher thresholds than lower density areas. Because the maximum value will be twice "d," this helps insure that the density does not get too high even in the most crowded of cells.

Other equations may be used to calculate the density threshold. For example, the foregoing equation may include a skew multiplier to change the range between the greatest and lowest threshold, such as "a" in density_threshold(C)=d*(1+ a*density(C)/max_density). Increasing the range may allow particularly dense regions to look even more dense relative to other areas.

Once a density threshold for a geographic area is determined, it is applied to the listings associated the geographic area.

One manner of applying the density threshold comprises selecting, from a cell, a number of listings that is equal to or proportional to the density threshold. For example, if the density threshold of two cells were 20 and 30 respectively, then the 20 highest-scoring listings from first cell may be selected for display and 30 highest-scoring listings from the second cell may be selected for display.

Alternatively, the database may be queried once for the purpose of analyzing the scoring information and determining density, and then again—with a score threshold as part of the query—to obtain the actual listings.

In that regard, a histogram may be created for each region cell associated with the map area. The histogram is filled with the listings contained in that cell, and each band of the histogram is associated with a different range of scores. Accordingly, if the highest possible score of a listing was 10 and the lowest was 1, and if there were seven listings "A" through "G" having scores A=4, B=6, C=7, D=7, E=8, F=9, G=9 in a particular cell Q, then the histogram for that cell might have 10 bands representing each possible score. The fourth band would contain listing A, the sixth band would contain listing B, the seventh band would contain both listings C and D, and the remaining bands would be similarly filled.

After the histogram is filled, the server iterates through the histogram from the highest band to the lowest. It keeps a running total of the number of cells in the bands and continues to travel until the running total exceeds the density threshold.

Using the cell example above, if the density_threshold(Q)=5, the server would stop at listings with score 7 because the running total at band 10 was zero, the running total at band 9 was 2 (listings F, G), the running total at band 8 was 3 (F, G, E), and the running total at band 7 was 5 (F, G, E, C, D).

Based on the scores of the listings in the cell, and the density threshold of the cell, a threshold based on score may thus be assigned to the cell. Using the example above, the score threshold of cell Q would be 7, because the density threshold was 5 and there were 5 listings at score 7 and above.

The score-based threshold and identification of the cell may then be used to requery the listings. For example, the original query (absent the location) is again used to pull listings, but this time the query will identify both cells and minimum scores (e.g., "all listings for "pizza" that have a score of 9 and are in cell Q, or have a score of 3 and are in cell R, or have a score of 9 and are in cell S"). This allows the map database to return a collection of listings that is already filtered with respect to density.

Figures 11, 12, 13:
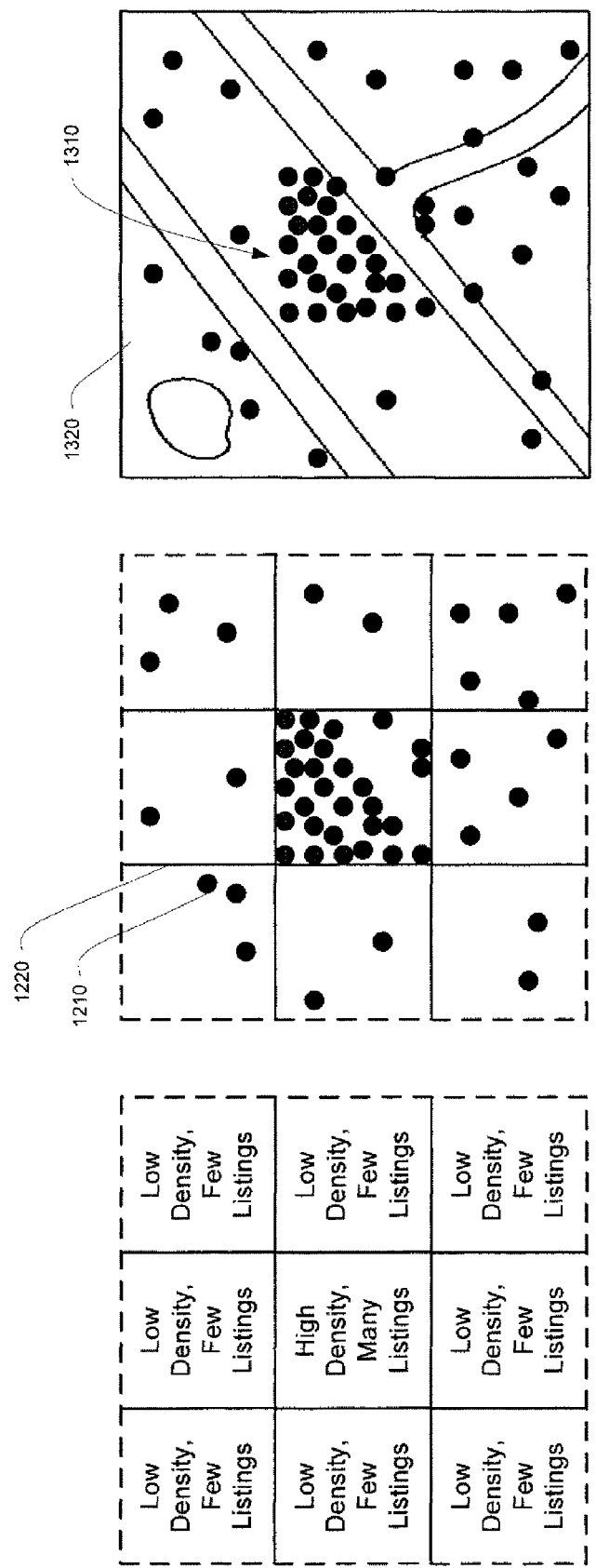
FIG. 11 illustrates the density of responsive listings in regions of a map in accordance with an aspect of the system and method.
FIG. 12 illustrates the positions of responsive listings in regions in accordance with an aspect of the system and method.
FIG. 13 is a map display in accordance with an aspect of the system and method.

As noted above, one system and method of displaying search results based on density comprises comparing listings at one area with listings at another area. If the areas do not overlap, it is possible that artifacts may appear. FIGS. 11-13 provide an extreme example for the purposes of illustration. As shown in FIG. 11, there are nine cells whereby the outer cells have few listings and a low density. The inner cell has many listings and a high density.

FIG. 12 illustrates where the selected listings such as listing 1210 may appear relative to their cell borders such as border 1220. Each dot identifies a selected listing and its position within the cell. FIG. 12 illustrates how these listings would appear when drawn on the map. Because of the disparity of the listings in the center cell versus the other cells, the vague outlines of the middle cell's boundaries may be seen (e.g., grid artifacts) when the listings are drawn on map as shown in FIG. 13. Thus, a user may improperly conclude that a region's stores are clustered in a square 130 in the middle of the map 1320. The square shape, however, is a function of the position of the region cell and not representative of actual geographic features of the map or its associated listings.

Figure 14:
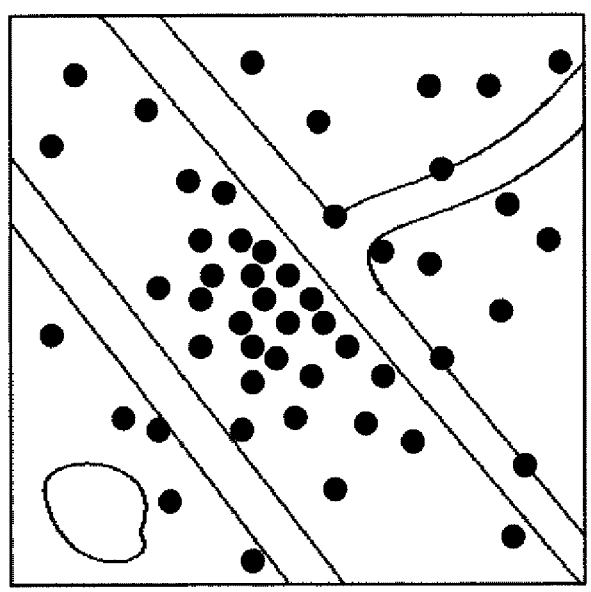
FIG. 14 is a map display in accordance with an aspect of the system and method.

In one aspect of the system and method, the system and method selects listings to be displayed so as to mitigate potential artifacts associated with the geographic areas used to determine density. One possible way of obscuring the borders is to use smoothing processes. The listings may be selected based not only on the density of their cell relative to other cells, but the position of the individual listing relative to other cells. If such a smoothing process were applied to the listings of FIG. 13, the selected listings would continue to show relative density but with less of the visual artifacts described above. FIG. 14 illustrates one possible result of applying a smoothing process to the listings shown in FIG. 13.

Figure 15:
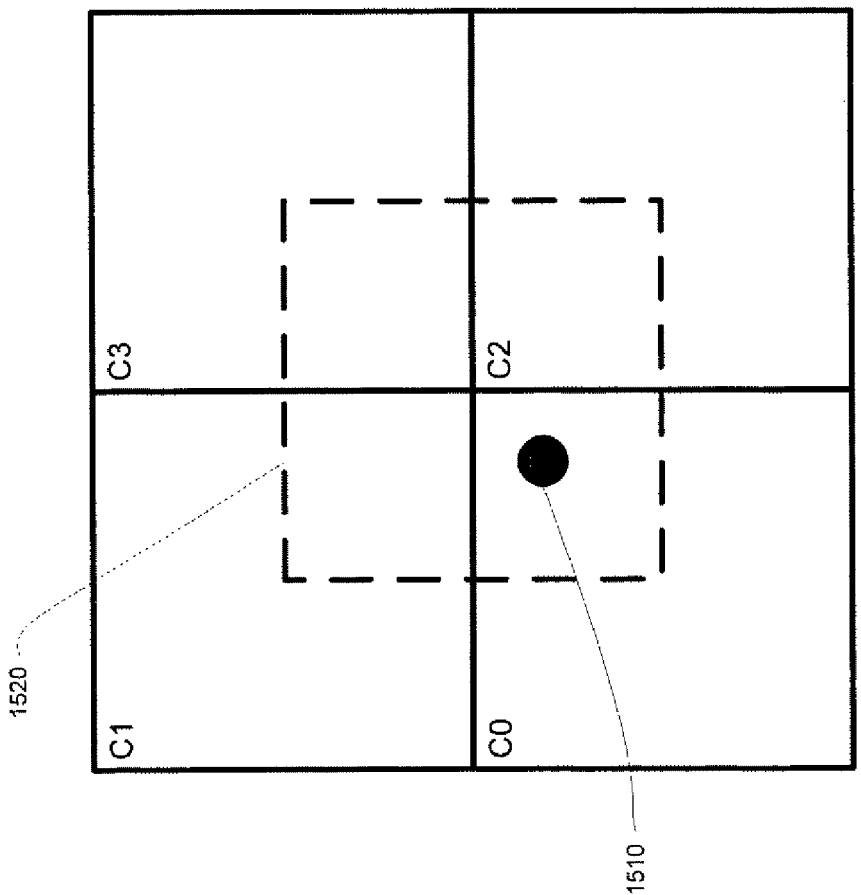
FIG. 15 is a schematic diagram in accordance with an aspect of the system and method.

One technique for performing smoothing is as follows. For each listing under consideration of being displayed, such as listing 1510 in FIG. 15, the four closest cells C1-C3 to the listing are identified.

The scoring threshold for the cells are determined. If the scoring threshold is absent (due to lack of listings), a score threshold of zero is assigned.

The centers are the cells are also found. If the listing 1510 lies inside the rectangle 1520 formed by these centers, linear interpolation may be used to determine the scoring value at the listing position. For example, if (xL, yL) is the coordinates of the listing, and (x0, y0) is the coordinates of C0, then equations may be derived as follows:

$$(1-u)*x0+u*x2=xL$$

$$(1-v)*y0+v*y1=yL$$

$$inh=(1-v)*((1-u)*z0+u*z2)+v*((1-u)*z1+u*z3)$$

with $0 \leq u < 1$ and $0 \leq v < 1$
where inh is the scoring threshold.

The third equation uses the scoring threshold values $z0, \ldots, z3$ as if they were assigned to the center of the cell. The three parametric equations above should determine a hyperbolic paraboloid sheet (a saddle) inside the four-centers rectangle.

If this process is extended to all applicable cells, a continuous surface is obtained that provides scoring thresholds in any point of the area covered by the cells. From the first two equations, u and v may be obtained:

$$u=(xL-x0)/(x2-x0)$$

$$v=(yL-y0)/(y1-y0)$$

The value of inh may be obtained by plugging the values of u and v into the third equation above. Ultimately, if the score of the listing is less than inh, the listing will be filtered out.

These smoothed scoring thresholds may be used to query the database (as described above). In response, the server selects responsive listings; this time, however, the selected listings will appear with less cell artifacts than without the smoothing.

The foregoing technique uses a form of linear smoothing to filter listings to remove the cell artifacts. However, the system and method is not limited to any particular process. For example, cubic smoothing may also be used. Cubic smoothing will tend to modify the scoring thresholds more at the borders than the centers, and thus tends to provide more visually pleasing results when neighboring cells have relatively large differences in density.

Once the other listings have been selected, such as based on density, the server creates an image of the other listings relative locations. For example, the server may create a bitmap image 1610 such as that shown in FIG. 16. In one aspect, the image is sized to be equal to the map area being displayed to the user. The server draws indications of the selected listings on the map such as black dot 1620.

The positions of the dots correspond with the geographic locations of the listings. Thus, the position of the dot 1620 relative to the other listings is proportional to the latitude/longitude position of the listing relative to the latitude/longitude position of the other listings.

The background of the image may be transparent, such as that indicated by region 1630. For example, if the image is created in PNG format, the pixels that are not occupied by icons (or other indications) of the other listings would be flagged as transparent.

In another aspect, the overlay image shown in FIG. 16 may be divided into pieces that correspond with the map tiles sent to the user.

The overlay image 1610 of other listings is then sent by the server to the client computer. In one aspect of the system and method, and if the indications of the other listings have already been selected and drawn by the server, the client computer's processor does not need to make any calculations with respect to the listings or their positions. The system and method may also send the score threshold to the client computer.

Figure 17:
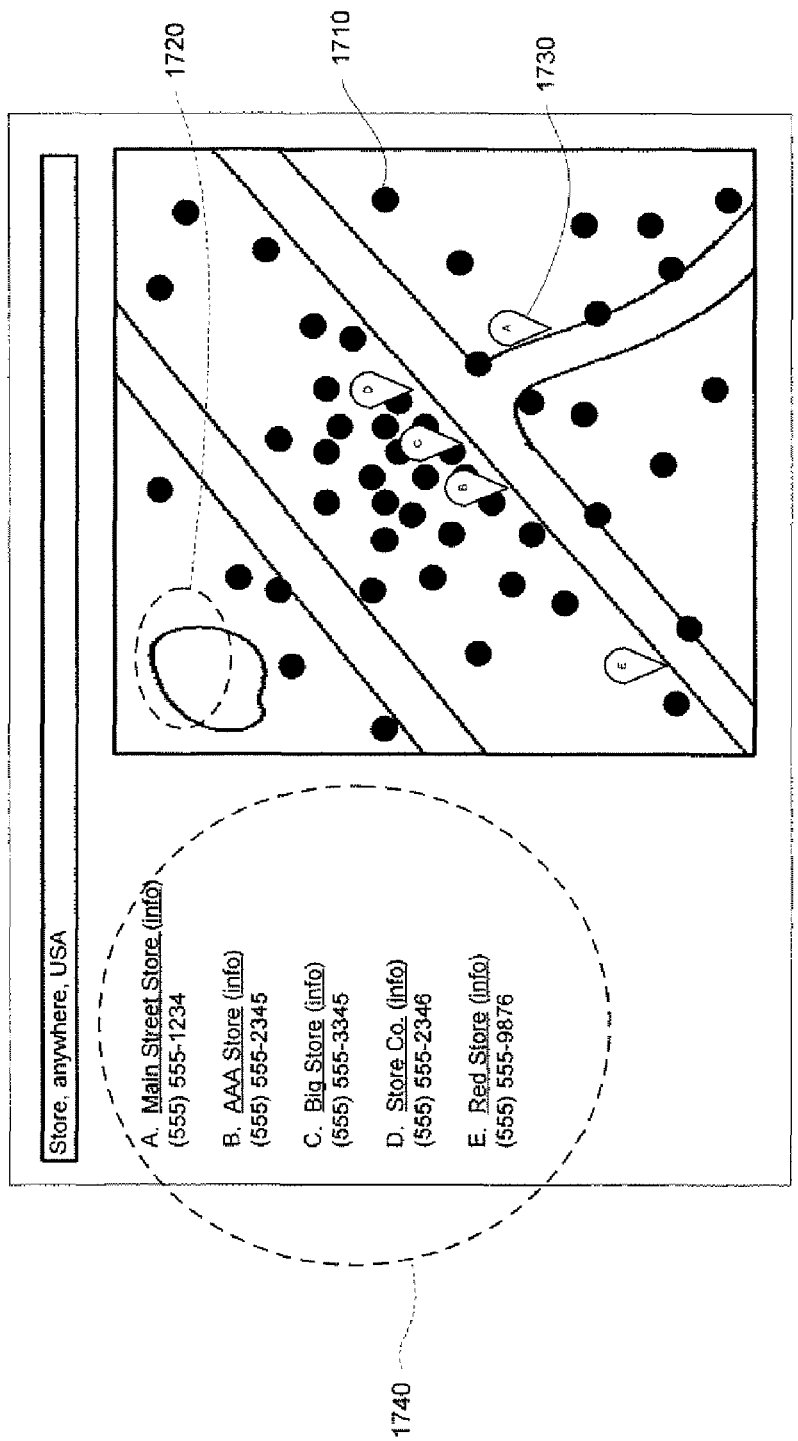
FIG. 17 is a screen shot of a map and a set of listings displayed in accordance with an aspect of the system and method.

As shown in FIG. 17, the client computer assembles the map and image overlay together in the web browser. The overlay is drawn at a layer above the map such that the indications of other listings 1710 appear in their respective positions on top of the map. Because the background of the overlay layer is transparent, the map tiles will show through the areas where indications are absent such as the lake in region 1720.

The client computer draws the top listings as icons 1730 on a layer above the map and other listings. It further provides a text description 1740 of the top listings adjacent to the map. As noted above, the icons 1730 of the top listings perform actions in response to user action, and also respond to user actions performed on the text descriptions.

In that regard, FIG. 17 shows varies a variety of aspects of the system and method in combination including: (a) graphical indications representing a set of features having geographical locations that are most likely to be of interest to the user based on the user's query and other factors, the icons being displayed by the client computer's processing of text data provided by a server; (b) graphical indications representing another set of features having geographical locations that are less likely to be of interest to the user but still correspond with the user's query; (c) the graphical indications of the other features being selected to represent the relative density of all features responsive to the user's request; (d) the graphical indications being pre-rendered as an image by the server so that the client computer may easily display the other features; (e) a text listing of at least some of the features and (f) the query including arbitrary words that are selected by users as compared to a list provided by the server.

In one aspect of the system and method, the client computer is also provided with information that permits interaction with the other listings. For example, when the user of the client computer hovers a mouse cursor over the map, the client computer may identify the tile under the mouse cursor and transmit a request for information about the other listings associated with that tile (or a portion of the tile such as the quarter-tile under the mouse cursor). In response, the server may transmit information associated with each of the other listings in the tile, such as JSON-formatted data identifying, for each listing, its identification number in the server and its position (in pixels) on the map. If a user clicks the map, the client computer may use this information to determine whether the user clicked one of the other listings and, if so, obtain and display more information about the listing from the server.

As noted above, the system and method is not limited to any particular configuration of servers and databases. Even so, the system and method may be particularly advantageous when used in connection with databases and servers performing separate functions. By way of example only, one server may make queries and returns listings whereas another server analyzes the queries. In that regard, and as described above, the system and method allows the second server to requery the first server rather than culling and reprocessing the listings itself.

Moreover, the method does not need to be divided among the server and client computer system as described above. In one aspect of the invention, the server may assemble the image of other listings directly on the map and transmit the map and indications of the other listings as a single combined image.

It will also be understood that the map area being viewed by the user and the map area that is analyzed as explained above need not be identical. For example, the system and method may analyze tiles and geographic areas that are not currently being displayed to the user. It may also send such tiles and geographic areas to the client computer in order to avoid performing a new set of queries and analysis if the user pans the map.

Indeed, one aspect of the system and method is particularly advantageous inasmuch as panning the map does not change the density of the other listings (see the foregoing description in connection with FIGS. 7-8).

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method, executing on hardware, of providing a map covering an area comprising:
   receiving a query, wherein the query includes a search term and a search area;
   determining matching listings, wherein a matching listing comprises a listing associated with a geographic location within the search area having information corresponding to the search term;
   dividing the search area into a plurality of regions and selecting a number of matching listings for each region, wherein for each region the selected number of matching listings is proportional to the density of matching listings in that region;
   determining a score for each matching listing in a given region;
   smoothing the score for each matching listing in the given region based on a distance between the geographical location associated with the matching listing and a location within the given region;
   using the smoothed scores for each matching listing in the given region to select the number of matching listings for the given region; and
   providing a map of the search area and information about the selected number of matching listings for each region in the search area.

2. The method of claim 1 wherein a listing has information corresponding to the search term when the listing has information that includes the search term.

3. The method of claim 1 wherein a matching listing comprises a business listing associated with a street address.

4. The method of claim 1 wherein the search area is determined from the coordinates of a map that is displayed to the user.

5. The method of claim 1 wherein the plurality of regions are substantially equal in area.

6. The method of claim 1 wherein the information about the selected number of matching listings for each region comprises a second map showing the location of at least one of the selected number of matching listings.

7. The method of claim 6 further comprising compositing the second map with the map of the search area.

8. The method of claim 1 wherein the information about the selected number of matching listings for each region comprises text data for at least one of the selected number of matching listings.

9. A system of providing a map covering an area comprising:
   a memory having instructions stored therein; and
   a processor coupled to the memory and configured to execute the instructions stored in the memory in order to:

receive a query, wherein the query includes a search term and a search area;

determine matching listings, wherein a matching listing comprises a listing associated with a geographic location within the search area having information corresponding to the search term;

divide the search area into a plurality of regions and select a number of matching listings for each region, wherein for each region the selected number of matching listings is proportional to the density of matching listings in that region;

determine a score for each matching listing in a given region;

smooth the score for each matching listing in the given region based on a distance between the geographical location associated with the matching listing and a location within the given region;

use the smoothed scores for each matching listing in the given region to select the number of matching listings for the given region; and provide a map of the search area and information about the selected number of matching listings for each region in the search area.

10. The system of claim 9 wherein a listing has information corresponding to the search term when the listing has information that includes the search term.

11. The system of claim 9 wherein a matching listing comprises a business listing associated with a street address.

12. The system of claim 9 wherein the search area is determined from the coordinates of a map that is displayed to the user.

13. The system of claim 9 wherein the plurality of regions are substantially equal in area.

14. The system of claim 9 wherein the information about the selected number of matching listings for each region comprises a second map showing the location of at least one of the selected number of matching listings.

15. The system of claim 14, wherein the processor is further configured to execute instructions to composite the second map with the map of the search area.

16. The system of claim 9 wherein the information about the selected number of matching listings for each region comprises text data for at least one of the selected number of matching listings.

* * * * *